(12) United States Patent
Schmitt et al.

(10) Patent No.: US 11,389,768 B2
(45) Date of Patent: Jul. 19, 2022

(54) METHOD OF CONTROLLING A MULTI SELECTIVE CATALYTIC REDUCTION SYSTEM

(71) Applicant: DELPHI TECHNOLOGIES IP LIMITED, St. Michael (BB)

(72) Inventors: Julien Schmitt, Kuntzig (FR); Michael Parmentier, Chatillon (BE)

(73) Assignee: Delphi Automotive Systems Luxembourg S.A., Bascharage (LU)

( * ) Notice: Subject to any disclaimer, the term of this patent is extended or adjusted under 35 U.S.C. 154(b) by 411 days.

(21) Appl. No.: 15/112,931

(22) PCT Filed: Jan. 20, 2015

(86) PCT No.: PCT/EP2015/050939
§ 371 (c)(1),
(2) Date: Jul. 20, 2016

(87) PCT Pub. No.: WO2015/110401
PCT Pub. Date: Jul. 30, 2015

(65) Prior Publication Data
US 2016/0346732 A1     Dec. 1, 2016

(30) Foreign Application Priority Data
Jan. 23, 2014     (EP) .................................... 14152280

(51) Int. Cl.
*F01N 3/20*     (2006.01)
*B01D 53/94*     (2006.01)
(Continued)

(52) U.S. Cl.
CPC ..... *B01D 53/9418* (2013.01); *B01D 53/9431* (2013.01); *B01D 53/9495* (2013.01);
(Continued)

(58) Field of Classification Search
CPC ........... F01N 2560/026; F01N 2340/02; F01N 2900/1622; F01N 2560/14; F01N 3/035;
(Continued)

(56) References Cited

U.S. PATENT DOCUMENTS

| 2011/0023446 A1 | 2/2011 | Dobson et al. |
| 2011/0252771 A1 | 10/2011 | Fujinaga et al. |
| 2015/0147250 A1* | 5/2015 | Nigro .................... F01N 3/2066 423/212 |

FOREIGN PATENT DOCUMENTS

| EP | 2181756 A1 | 5/2010 |
| EP | 2439384 A1 | 4/2012 |

(Continued)

OTHER PUBLICATIONS

PCT/EP2015/050939 International Search Report dated Mar. 25, 2015.

*Primary Examiner* — Anthony J Zimmer
*Assistant Examiner* — Syed T Iqbal
(74) *Attorney, Agent, or Firm* — Joshua M. Haines

(57) ABSTRACT

A method of controlling a catalytic exhaust system having a first catalytic unit located upstream of a second catalytic unit includes i) providing a relationship between the temperature of the first catalytic unit, an amount of NH3 stored in the second catalytic unit, and a corresponding limit value of the amount of NH3 permitted in the first catalytic unit; ii) measuring or estimating the amount of NH3 in the second catalytic unit; iii) measuring or estimating the temperature of the first catalytic unit; iv) using the relationship and measured/estimated parameters of steps ii and iii to provide the limit value for the amount of NH3 to be stored in the first catalytic unit; and v) using the parameter from iv in the control of the catalytic exhaust system.

12 Claims, 5 Drawing Sheets

(51) Int. Cl.
  *F01N 3/035* (2006.01)
  *F01N 13/00* (2010.01)
  *F01N 9/00* (2006.01)

(52) U.S. Cl.
  CPC ............ *F01N 3/035* (2013.01); *F01N 3/208* (2013.01); *F01N 9/00* (2013.01); *F01N 9/005* (2013.01); *F01N 13/009* (2014.06); *B01D 2255/904* (2013.01); *B01D 2255/911* (2013.01); *B01D 2255/915* (2013.01); *F01N 2570/18* (2013.01); *F01N 2610/02* (2013.01); *F01N 2900/1602* (2013.01); *F01N 2900/1616* (2013.01); *Y02T 10/12* (2013.01); *Y02T 10/40* (2013.01)

(58) Field of Classification Search
  CPC .... F01N 2560/06; F01N 3/2066; F01N 3/208; F01N 2610/02; F01N 2900/0412; F01N 2900/1404; F01N 13/0093; F01N 2900/1616; F01N 2900/1602; F01N 9/00; F01N 13/009; F01N 2570/18; F01N 9/005; Y02T 10/24; Y02T 10/47; B01D 2251/2062; B01D 53/8696; B01D 53/8631; B01D 2255/911; B01D 2255/904; B01D 53/9495; B01D 53/9418; B01D 2255/915; B01D 53/9431
  See application file for complete search history.

(56) References Cited

FOREIGN PATENT DOCUMENTS

| | | |
|---|---|---|
| FR | 2902139 A1 | 12/2007 |
| WO | 2005/068797 A1 | 7/2005 |
| WO | 2013/178435 A1 | 12/2013 |

\* cited by examiner

METHOD OF CONTROLLING A MULTI SELECTIVE CATALYTIC REDUCTION SYSTEM

CROSS REFERENCE TO RELATED APPLICATIONS

This application is a national stage application under 35 USC 371 of PCT Application No. PCT/EP2015/050939 having an international filing date of Jan. 20, 2015, which is designated in the United States and which claimed the benefit of EP Patent Application No. 14152280.5 filed on Jan. 23, 2014 the entire disclosures of each are hereby incorporated by reference in their entirety.

FIELD OF THE INVENTION

The invention relates to vehicle Selective Catalytic Reduction (SCR) architectures/systems and has particular application, to controlling multi-SCR systems where there is more than one SCR unit.

BACKGROUND TO THE INVENTION

Multi-SCR catalyst architectures are being introduced in today's vehicle exhaust systems to achieve higher NOx conversion efficiency than conventional single under-floor SCRs. A typical multi-SCR architecture includes a close-coupled SCR on filter (SCRoF) unit, downstream of which is located an under-floor SCR (U/F SCR) unit. This configuration is advantageous in terms of NOx performance, especially due to providing faster light-off and higher temperature of the close-coupled SCRoF unit combined with the extra volume in the under-floor location. The lower operating temperature of the U/F SCR is also beneficial for managing higher NH3 coverage in the SCRoF unit and NH3 slipping out of the SCRoF during thermal transients.

Conventional feed-forward control of such multi-SCR systems generally focuses on the first SCR unit in the system (SCRoF) because the ammonia (NH3) filling level (or coverage) in the first catalytic unit is critical for achieving a globally high NOx conversion. With this kind of control, the under-floor SCR is used as a passive NH3 trap/converter. To make sure that no NH3 is released from the under-floor SCR during severe thermal transients, such systems are calibrated such that the amount of NH3 released from the SCRoF is limited in all conditions. The disadvantage of such an approach is that neither the SCRoF nor the under-floor SCR is optimally loaded with NH3, to prevent NH3 slip in all driving conditions. The NOx conversion achieved with such a control can be limited in comparison with the full potential of both catalysts.

It is an object of the invention to overcome the aforesaid problems.

STATEMENT OF THE INVENTION

In one aspect is provided a method of controlling a catalytic exhaust system including a first catalytic unit located upstream of a second catalytic unit, comprising: i) providing a relationship between the temperature of the first catalytic unit, the amount of NH3 stored in the second catalytic unit and the corresponding limit value of the amount of NH3 permitted in the first unit; ii) measuring or estimating the amount of NH3 in the second catalytic unit; iii) measuring or estimating the temperature of the first catalytic unit; iv) using said relationship and measured/estimated parameters of steps ii) and iii) to providing a limit value for the amount of NH3 to be stored in said first catalytic unit v) using said parameter from iv) in the control of said system.

The units may be Selective Catalytic Reduction units. The unit may be a Selective Catalytic Reduction on Filter unit (SCRoF) and said second unit an under floor Selective Catalytic Reduction unit (U/F SCR).

In step ii), said amount of ammonia may be provided by a model of the second unit and/or the temperature of the first model is provided by a model of the first unit.

The provided limit value is compared with a measured or estimated actual value, and consequent to said comparison, the amount of urea injected upstream of said first unit is controlled.

The parameter from step iv) may be input into a model of an SCR unit.

In a further aspect is provided a system of controlling a catalytic exhaust system including a first catalytic unit located upstream of a second catalytic unit, comprising: means to provide a relationship between the temperature of the first catalytic unit, the amount of NH3 stored in the second catalytic unit and the corresponding limit value of the amount of NH3 permitted in the first unit; means to measure or estimate the amount of NH3 in the second catalytic unit; means to measure or estimate the temperature of the first catalytic unit; means to use said relationship and measured/estimated parameters to provide said limit value for the amount of NH3 to be stored in said first catalytic unit; means to use said limit value parameter in the control of said system.

DETAILED DESCRIPTION

Figure 1:
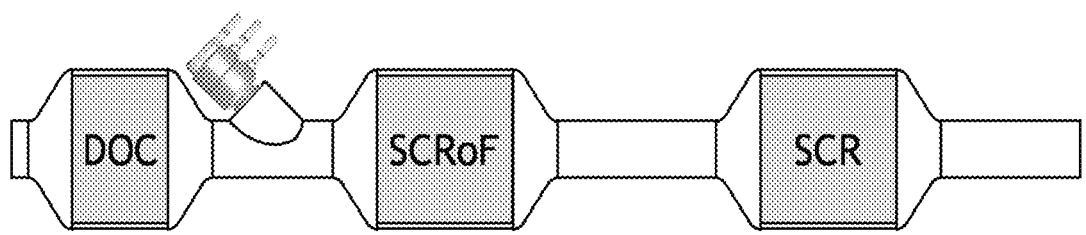
FIG. 1 shows a portion of an exhaust system incorporating multi-SCR units.

FIG. 1 shows a schematic diagram of a portion of an exhaust system showing a DOC unit, downstream of which is located a first SCRoF and a second (U/F) SCR, located under floor. Urea is injected upstream of the first SCR unit; this is converted by the heat of the exhaust into ammonia which is used as a catalytic agent, in the downstream units.

One of the main advantages of a SCRoF catalyst combined with an under-floor SCR is the fast light-off of the system provides high NOx conversion to be achieved early. The SCRoF should be loaded with NH3 to ensure a good overall NOx conversion efficiency under conditions where the U/F SCR is still too cold to convert any NOx. On the other hand, due to the limited SCRoF volume, this unit alone may not be sufficient to achieve tailpipe emission targets, especially for high flow conditions as seen in off-cycle conditions. Therefore some NOx conversion must be performed in the U/F SCR. In order to store NH3 in the U/F SCR, there should be a degree of NH3 slip from SCRoF to the U/F SCR. Thus in order to achieve optimum operation in terms of meeting emissions targets as well as preventing ammonia slip from the exhaust, the SCRoF should always be operated at a high NH3 storage level, as close as possible to its maximum capacity. However, if too much NH3 is stored in the system, temperature transients can lead to NH3 slip from the under floor SCR above tolerated limits. The invention provides a control strategy which to maximize the NH3 stored in the SCRoF while maintaining the tailpipe NH3 slip below the requisite limits under any driving condition.

Background Control of a Single SCR.

In this section will be described how, with reference to some prior art methodology, how a single SCR unit can be controlled.

Figure 2:
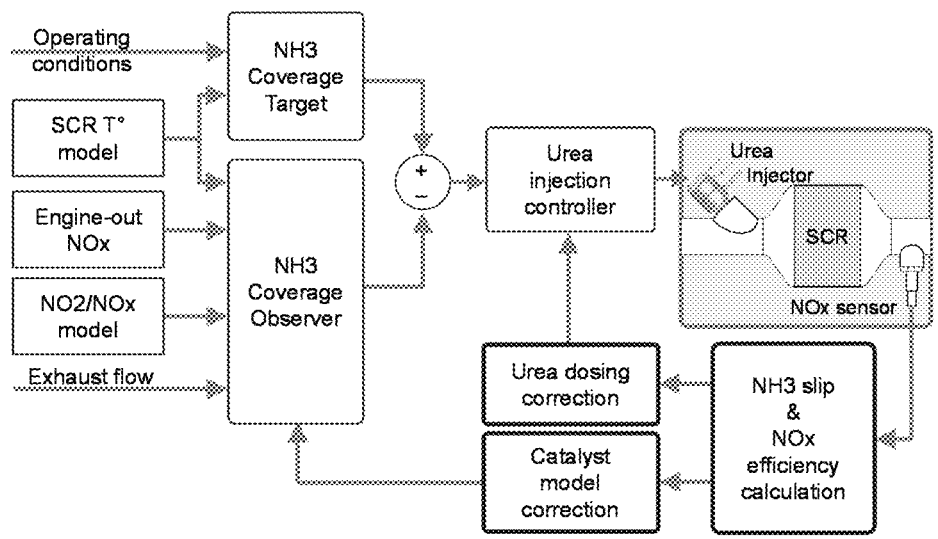
FIG. 2 shows a known model used to control a single SCR unit.

Prior art methodology has attempted to use techniques to model, e.g. an SCR unit, for the purpose of control strategy. FIG. 2 shows such a model for a single SCR which shows the relevant input and output parameters as well as elements of the model. The core of the controller is often referred to the "NH3 Coverage Observer". It consists of a phenomenological chemical model, accounting for the main parameters that influence NOx conversion and resulting NH3 coverage: space velocity, catalyst temperature, modeled NO2/NOx ratio in the feed-gas, NH3 storage capacity, NH3 coverage, etc. The NH3 Coverage Observer requires several inputs such as the NO2/NOx ratio in the feed-gas. This ratio may also modeled based on space velocity, temperature and soot mass accumulated in the particulate filter. The engine-out NOx can either be measured by a NOx sensor or estimated by a model also embedded in the. As shown in FIG. 2, control adapts the urea dosing such that the modeled NH3 coverage matches target NH3 coverage. The target NH3 coverage is calibrated to optimize the trade-off between NOx conversion and NH3 slip downstream of the controller SCR. FIG. 1 describes the principle of the NOx sensor based closed-loop control. Since the signal processing is able to extract both NOx and NH3 from the raw sensor signal, the controller can correct either the SCR catalyst model (NH3 Coverage observer) or directly the urea quantity demand (Urea injection controller).

DETAILED DESCRIPTION OF ASPECTS OF THE INVENTION

A problem with taking a purely modeling approach to multi-SCR architectures is that with a multi SCR catalyst systems such as a close-coupled SCRoF combined with an under-floor SCR, extensive testing of all parameters which influence NOx conversion efficiency and tailpipe NH3 slip would be necessary and this would be time and resource consuming. A multi-slice 1D chemical model was developed to assess the importance of each parameter in a multi SCR catalyst control strategy.

In essence in one aspect of the invention, the control is provided by providing models, connected in series, for the SCRoF and the U/F SCR so as to model the complete SCR exhaust line. In particular, in one aspect of the invention focuses on the use of a feed forward controller which provides a relationship between a) the SCRoF temperature, b) NH3 stored in the U/F SCR and c) the maximum NH3 stored in the SCRoF, which may be considered to offer optimum efficiency whist retaining emission requirements, and so can be considered the target or limit value for the NH3 stored in the SCRoF. This parameter can then be used in appropriate control. Hereinafter in the claims this value will be referred to as the limit value.

Figure 3:
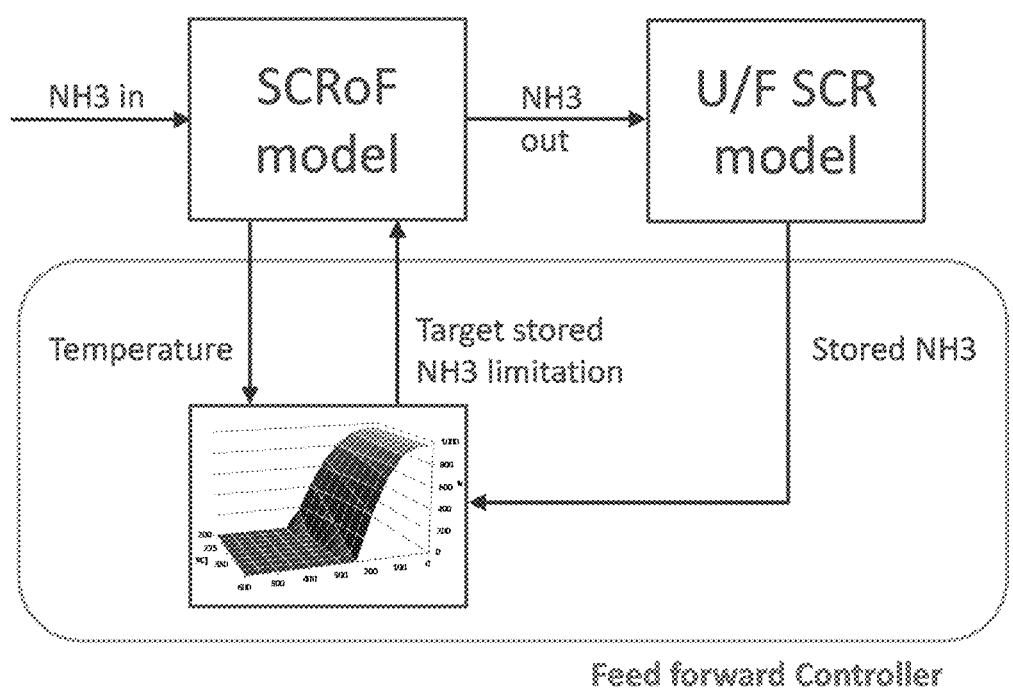
FIG. 3 shows a simplified model of a multi-SCR system having an SCRoF and U/F SCR units, and includes a feed forward control according to an example of the invention.

FIG. 3 shows a simplified model of a multi-SCR system having an SCRoF and an U/F SCR, and includes a feed forward controller which relates the above parameters according to one aspect of the invention. This feed forward controlled is a core feature, and provides such a relationship between the SCRoF temperature, stored NH3 in the U/F SCR and maximum/target (i.e. limit value) NH3 stored in the SCRoF under ideal/optimized conditions. The relationship can be visualised as a 3-dimensional plot as shown in more detail in FIG. 4. The relationship may be stored as, e.g. 3-d look up tables, and the data (target/limit parameter of NH3 stored in first unit) used in control strategy or control models to optimize performance.

It would be clear to the skilled person how such data used in the feed forward controller (e.g. provided in the look-up tables) can be provided; by performing requisite testing or simulation. In order however to explain this in more detail; there follows an explanation how such data can be provided for to provide optimum efficiency without excessive NH3 slip under various conditions.

As the capacity of SCR catalysts decreases with temperature, the worst case scenario (which can lead to excessive tailpipe NH3 slip) is a rapid temperature increase of the exhaust, for example due to sudden driver acceleration. Known models were used for this scenario to provide simulations to understand the parameters required to be taken into account in the control of multi SCR systems to avoid excessive NH3 slip. It was determined that the highest temperature transient occurs during acceleration where the SCRoF bed temperature reaches 400° C.; with 220 ppm engine-out NOx at an exhaust flow of 26 g/s. To replicate this scenario, a temperature step from current temperature to 400° C. was applied at the DOC inlet. The temperature evolution along the exhaust line was simulated using known temperature models. The NH3 slip was simulated using the SCR models described above.

Figure 5:
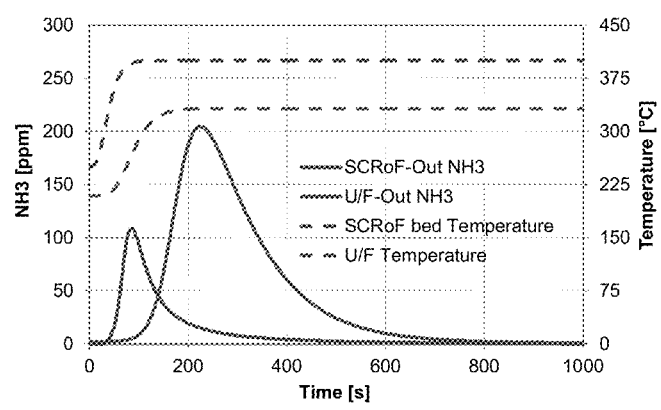
FIG. 5 shows an example outlining a simulation used to provide the data of FIG. 4; and, FIG. 6 shows test results from implementation of the invention.

FIG. 5 shows an example of a temperature step with the SCRoF at 170° C. and the U/F SCR at 140° C. as initial conditions. Both catalysts have a pre-defined level of stored NH3. This temperature step results in a tailpipe NH3 slip peak of more than 200 ppm. The same type of simulation was performed for all combinations of SCRoF temperature and NH3 filling level and U/F SCR temperature and NH3 filling level. Around 1000 simulations were performed on the system to identify influencing parameters to limit the tailpipe NH3 slip. On all these tests, the maximum tailpipe NH3 slip was logged. As described before, ignoring emission of NH3, the optimum control of the dual unit SCR system is achieved by maximizing the stored NH3 in the first SCR. However, as explained earlier, this can lead to a high tailpipe NH3 slip in case of a sudden temperature change. All the points with a maximum NH3 slip below the target limit value, here set to 30 ppm were selected. A model was then built which outputs the maximum acceptable NH3 stored in the SCRoF as a function of the SCRoF temperature and stored mass in the U/F SCR. The initial temperature of the U/F SCR has only a very minor influence on the model, so the model can be reduced to a 3D map function of temperature of the SCRoF and stored mass in the U/F SCR to output the maximum stored mass in the SCRoF under which the limit slip value of 30 ppm is not exceeded for the step test.

Figure 4:
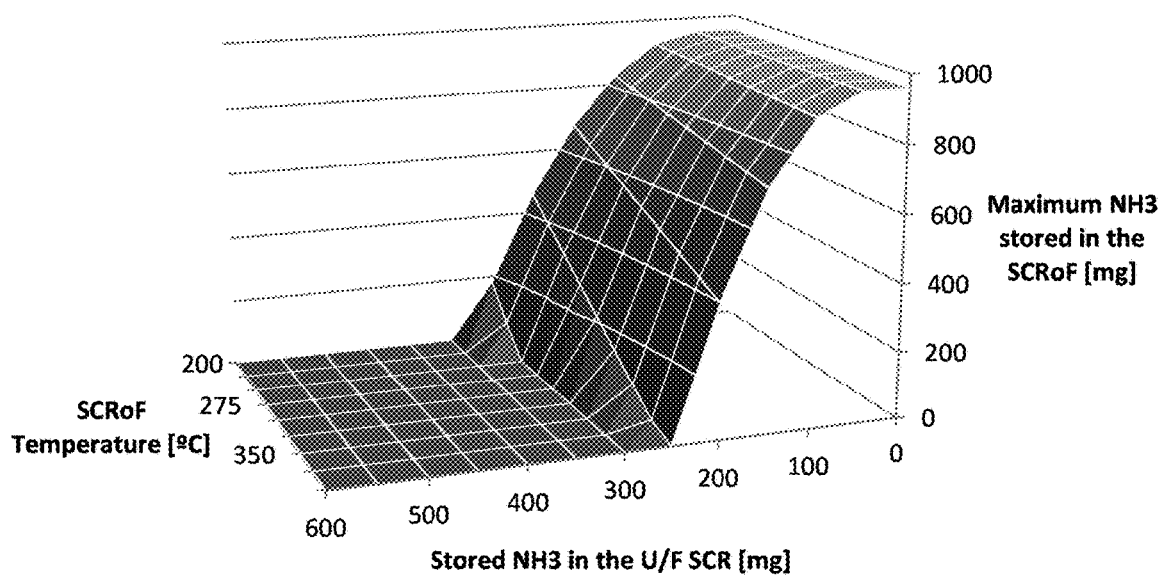
FIG. 4 shows a useful relationship between parameters used in the feed forward control example of the FIG. 3 example.

If the NH3 stored in the SCRoF is constantly kept lower or equal to the value given by FIG. 4, the tailpipe NH3 slip should not exceed 30 ppm, even under the worst case temperature transient considered. It can be seen from this table that when the amount of stored NH3 in the U/F SCR exceeds 300 mg, the SCRoF should be emptied by stopping urea injection. So, as a general comment, the U/F SCR coverage must be kept at relatively low values to ensure no excessive NH3 slip at the tailpipe; this is the target we would specify for the stored NH3 in UF. Also, for a constant stored mass in the second SCR catalyst, when the temperature increases, the SCRoF has to be emptied.

So in essence in one aspect the invention provides a means of providing the very useful parameter of the maximum allowable amount of NH3 that should be stored in the first SCR unit of a multi-SCR system for optimum efficiency and performance. This parameter is provided by pre-storing a relationship between this parameter and the key parameters of the ammonia levels in the second unit, and the temperature of the first SCRoF unit, for optimum performance conditions. Thus this target parameter can be determined for example by storing in a look-up table, and this used in control strategies or control models.

Thus for example such a look-up table can be for example, integrated in the control shown in FIG. 1 to calculate the "NH3 coverage limit" of the SCRoF. As the NH3 coverage of the U/F SCR is an input to drive the SCRoF coverage target, it is estimated, using a similar SCR model as used in the control presented in FIG. 1 for the U/F SCR. The NH3 flow entering the second catalyst is either estimated by the SCRoF model for pure open-loop control or can also be measured by a sensor.

Thus the relationship data (obtained from the simulations) can be used to design control structures, which can then be applied on real combined SCRoF with U/F SCR systems to assess the performance of such a combined control. The NH3 limit table of the SCRoF from FIG. 3 can thus be used as a calibration parameter.

Figure 6:
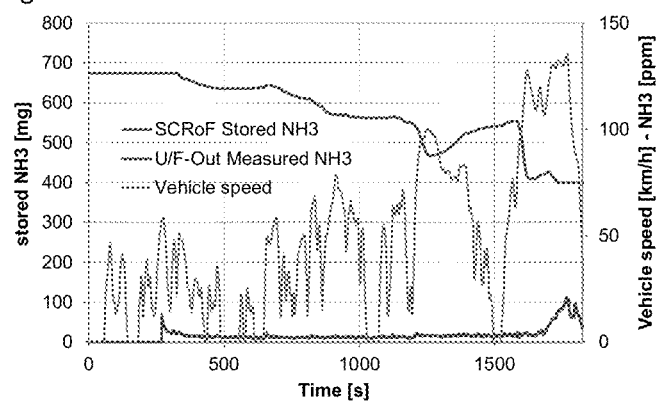

FIG. 6 shows the performance of the combined control. The maximum slip at the tailpipe stays below 30 ppm and the NOx conversion efficiency of the overall system is at 92%. As expected, the major part of the NOx is converted in the SCRoF which conversion efficiency is at 78%. The tailpipe NH3 slip, being close to the target limit, indicates that the U/F SCR is operated at an optimum efficiency to convert the remaining NOx after the SCRoF.

Another way of explaining aspects of the invention is that the feed forward control demands more urea depending on the target NH3 filling for the UF SCR. This offsets the NH3 slipping out of the SCRoF to make sure enough NH3 is sent to the UF SCR. The methodology according to aspects of the invention limits the coverage target of the SCRoF to prevent tailpipe slip and controls the UF coverage to a target, like for a single SCR control. Because of complexity of a dual SCR system, the UF cannot be accurately controlled at this target. This is why there is the feature of introducing a limit to the SCRoF stored, to prevent tailpipe slip. Also controlled is the UF to a predefined target coverage, and can be done in the same way as for a single SCR system. The feature of the SCRoF coverage limit can supplement the existing feed-forward controller.

The invention claimed is:

1. A method of controlling a catalytic exhaust system including a first catalytic unit located upstream of a second catalytic unit, said method comprising:
   i) providing a relationship between a temperature of the first catalytic unit, an amount of NH3 stored in the second catalytic unit, and a limit value of an amount of NH3 permitted in the first catalytic unit;
   ii) measuring or estimating the amount of NH3 in the second catalytic unit;
   iii) measuring or estimating the temperature of the first catalytic unit;
   iv) using said relationship and the measured or estimated amount of NH3 in the second catalytic unit of step ii and the measured or estimated temperature of the first catalytic unit of step iii to provide the limit value for the amount of NH3 to be stored in said first catalytic unit; and
   v) using said provided limit value for the amount of NH3 to be stored in said first catalytic unit from iv in the control of said catalytic exhaust system by controlling injection of urea into the catalytic exhaust system;
   wherein step v includes injecting urea which maintains NH3 stored in said first catalytic unit lower than, or equal to, the limit value for the amount of NH3 to be stored in said first catalytic unit from step iv.

2. A method as claimed in claim 1 wherein said first catalytic unit and said second catalytic unit are Selective Catalytic Reduction units.

3. A method as claimed in claim 2 wherein said first catalytic unit is a Selective Catalytic Reduction on Filter unit (SCRoF) and said second catalytic unit is an under floor Selective Catalytic Reduction unit (U/F SCR).

4. A method as claimed in claim 1 wherein in step ii, the amount of NH3 in the second catalytic unit is provided by a model of the second catalytic unit.

5. A method as claimed in claim 1 wherein in step iii, the temperature of the first catalytic unit is provided by a model of the first catalytic unit.

6. A method as claimed in claim 1 wherein:
   in step ii, the amount of NH3 in the second catalytic unit is provided by a model of the second catalytic unit; and
   in step iii, the temperature of the first catalytic unit is provided by a model of the first catalytic unit.

7. A method as claimed in claim 1 wherein the provided limit value for the amount of NH3 to be stored in the first catalytic unit is compared with a measured or estimated actual value, and injecting an amount of urea upstream of the first catalytic unit based on the comparison.

8. A method as claimed in claim 1 wherein the provided limit value for the amount of NH3 to be stored in said first catalytic unit from step iv is input into a model of an SCR unit.

9. A system of controlling a catalytic exhaust system including a first catalytic unit located upstream of a second catalytic unit, the system comprising:
   means configured to provide a relationship between a temperature of the first catalytic unit, an amount of NH3 stored in the second catalytic unit, and a limit value of the amount of NH3 permitted in the first catalytic unit;
   means configured to measure or estimate the amount of NH3 in the second catalytic unit;
   means configured to measure or estimate the temperature of the first catalytic unit;
   means configured to use the relationship and the measured or estimated amount of NH3 in the second catalytic unit and the measured or estimated temperature of the first catalytic unit to provide the limit value for the amount of NH3 to be stored in said first catalytic unit; and
   means configured to use the limit value for the amount of NH3 to be stored in said first catalytic unit in the control of said catalytic exhaust system.

10. A system as claimed in claim 9 wherein said first catalytic unit and said second catalytic unit are Selective Catalytic Reduction units.

11. A system as claimed in claim 10 wherein the first catalytic unit is a Selective Catalytic Reduction on Filter unit (SCRoF) and said second catalytic unit is an under floor Selective Catalytic Reduction unit (U/F SCR).

12. A system as claimed in claim 9 further comprising:
   means configured to compare the limit value for the amount of NH3 to be stored in said first catalytic unit with a measured or estimated actual value; and
   means configured to control an amount of urea injected upstream of the first catalytic unit dependent upon the output of the means configured to compare.

* * * * *